United States Patent [19]

Bower

[11] Patent Number: 4,765,456
[45] Date of Patent: Aug. 23, 1988

[54] VARIABLE SPEED BELT CONVEYOR DRIVE SYSTEM

[75] Inventor: Lewis R. B. Bower, Huddersfield, England

[73] Assignee: Fletcher Sutcliffe Wild Limited, Wakefield, England

[21] Appl. No.: 8,567

[22] Filed: Jan. 29, 1987

[30] Foreign Application Priority Data

Feb. 5, 1986 [GB] United Kingdom ............... 8602846

[51] Int. Cl.$^4$ ........................................... B65G 43/00
[52] U.S. Cl. .................................... 198/810; 198/855; 192/3.21; 192/3.33; 318/77; 318/85
[58] Field of Search ............................ 198/570–577, 198/810, 854, 855; 192/3.33, 3.21; 74/731, 733; 318/41, 45, 49, 68, 77, 85

[56]  References Cited

U.S. PATENT DOCUMENTS

| | | | |
|---|---|---|---|
| 2,707,408 | 5/1955 | Ahlen | 192/3.33 X |
| 3,224,537 | 12/1965 | Hilpert | 192/3.33 X |
| 3,561,367 | 2/1971 | Black | 192/3.33 X |
| 3,812,947 | 5/1974 | Nygaard | 198/341 X |
| 4,032,003 | 6/1977 | Hull | 198/855 |
| 4,574,943 | 3/1986 | Green | 198/810 |
| 4,586,401 | 5/1986 | Nogle | 74/731 X |
| 4,673,071 | 1/1987 | Moroto et al. | 192/3.21 |

Primary Examiner—Robert J. Spar
Assistant Examiner—Lyle Kimms
Attorney, Agent, or Firm—Trexler, Bushnell, Giangiorgi & Blackstone, Ltd.

[57]  ABSTRACT

A variable speed conveyor drive system, which is programmable to suit various operating conditions; comprises a master drive unit (7) having a drive motor (16), at least one slave drive unit (8–10, 14, 15) having a drive motor (16), a monitor and control unit (23), a control loop (24, 26, 27, 37, 58) from the master drive unit (7) to the monitor and control unit (23), a multiplexer (25) with a master outlet (26) and a slave outlet (27) for each slave drive unit (8–10, 14, 15), the master multiplexer outlet (27) being connected to the master drive unit (7) to form a part of the control loop (24, 26, 27, 37, 58), whereby all motors (16) share the load at a pre-programmed level at any speed of operation, and each slave multiplexer outlet (27) having an individually adjustable and programmable time delay operable both before start-up and during running of the conveyor (1).

8 Claims, 2 Drawing Sheets

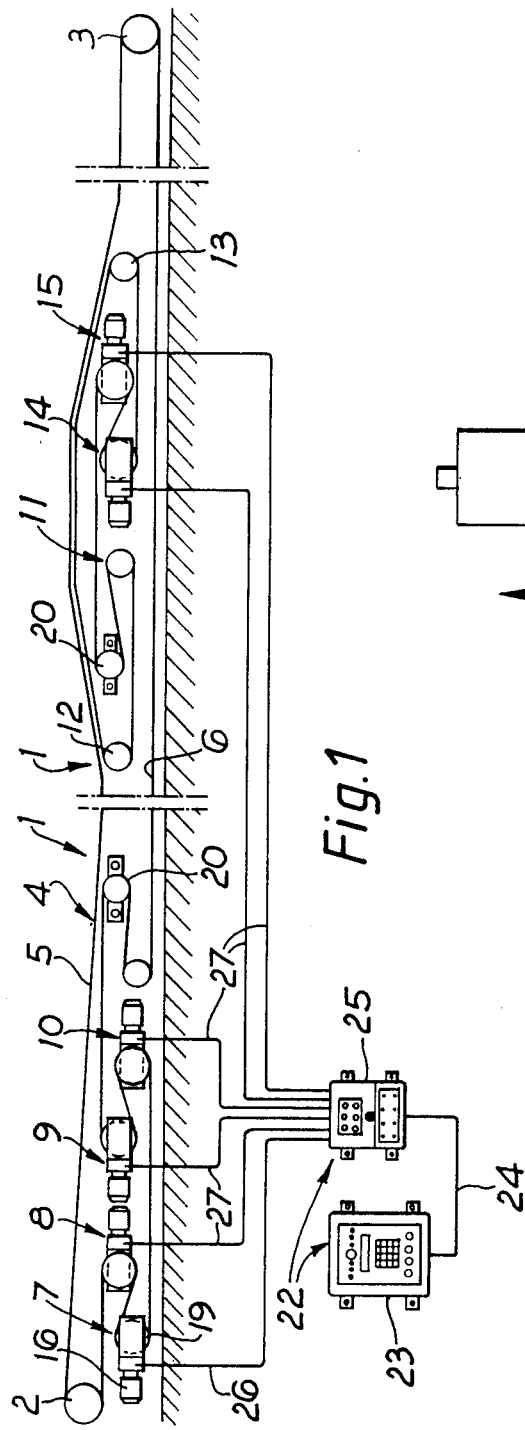
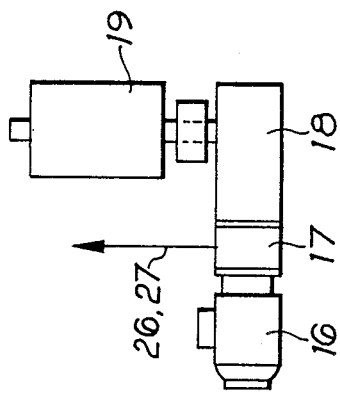

VARIABLE SPEED BELT CONVEYOR DRIVE SYSTEM

This invention relates to a variable speed conveyor drive system for multi-motor operation. The conveyor may be a belt conveyor or a scraper chain conveyor.

It is known that with variable speed belt conveyors of substantial length, e.g. 1 mile, required for long distance transportation of materials (as may be used for underground mining operations, or in quarries, steelworks etc.) great care must be exercised in the timing of the switching in and out of the various drive motors to avoid firstly damage to the belt by over tension and secondly the feeding of slack belt with its attendant tracking or stability problems, and time delay arrangements have been proposed for motor control, but suited to the particular installation and without providing flexibility of control.

According to a first aspect of the present invention there is provided a variable speed conveyor drive system, comprising:

(a) a master drive unit having a drive motor;
(b) at least one slave unit having a drive motor;
(c) a monitor and control unit;
(d) a control loop from the master drive unit to the monitor and control unit;
(e) a multiplexer with a master outlet and a slave outlet for the or each slave drive unit;
(f) the master multiplexer outlet being connected to the master drive unit to form a part of the control loop whereby all the motors share the load in driving the associated conveyor at a pre-programmed level at any speed of operation, and
(g) the or each slave multiplexer outlet having an individually adjustable and programmable time delay means operable both before conveyor start-up and during running of the conveyor.

Thus, the system in accordance with the invention, by providing the secondary outlet(s) with individually adjustable and programmable time delays, enables a standard system to be manufactured, which is capable of being fitted to a range of conveyors requiring various operating characteristics and start-up modes, with specific adjustment to meet individual needs being effected on-site, and furthermore, with further adjustment readily possible should operational experience shown this to be necessary.

In accordance with another significant feature of the invention, the slave outlet(s) also has an individually adjustable load share facility, resulting in the same advantages as the adjustable time delay facility. Thus, load share of the secondary motors controlled by the secondary outlet(s) need not be equal and may be set say between 75% and 100% of the full power of the motors. In detail, the multiplexer may be provided with five secondary outlets, so that up to five slave motors may be controlled by the one drive system, but advantageously the arrangement is such that the rated power of each of the motors can be regulated to suite the required drive power.

Each drive unit preferably comprises an electric motor, a universal control drive (as hereinafter defined) and, normally, a speed reduction gearbox having an output shaft to drive a rotary member appropriate to the kind of conveyor involved, e.g. a drum for a belt conveyor or a sprocket barrel for a scraper chain conveyor. Each universal control drive preferably comprises a torque converter preceded by a modulated wet clutch, the latter having an engagement-control hydraulic circuit, as well as a lubrication circuit, while the torque converter is preferably provided with a lock-up clutch, again preferably hydraulically controlled. With such drive units, the control loop would be of an electro-hydraulic kind.

A control unit with a modulated clutch requires a modulating valve, conveniently solenoid operated, to control the rate of modulation, and this provides, in the or each slave unit, a simple means of load sharing, as the modulation rate of the slave units can be readily adjusted by standard electronic control means, so that the or each slave unit operates at e.g. 75% to 100% of the master unit power output, whereas if the power is to be shared equally between the master unit and the slave unit(s) then all the modulating valves modulate at the same frequency.

According to a second aspect of the invention there is also provided a belt conveyor incorporating with a drive system as described above.

According to a third aspect of the invention, there is provided a scraper chain conveyor incorporating a drive system as defined above.

Normally, a scraper chain conveyor would incorporate but one slave unit located at the tail end of the conveyor, with the master drive unit located at the head end of the conveyor.

The invention will now be described in greater detail, by way of example, with reference to the accompanying drawings, in which:

FIG. 1 is a side elevation of a drive system and conveyor in accordance with the first and second aspects of the invention;

FIG. 2 is a plan view, to an enlarged scale, of one of the drive units of FIG. 1.

Figure 3:
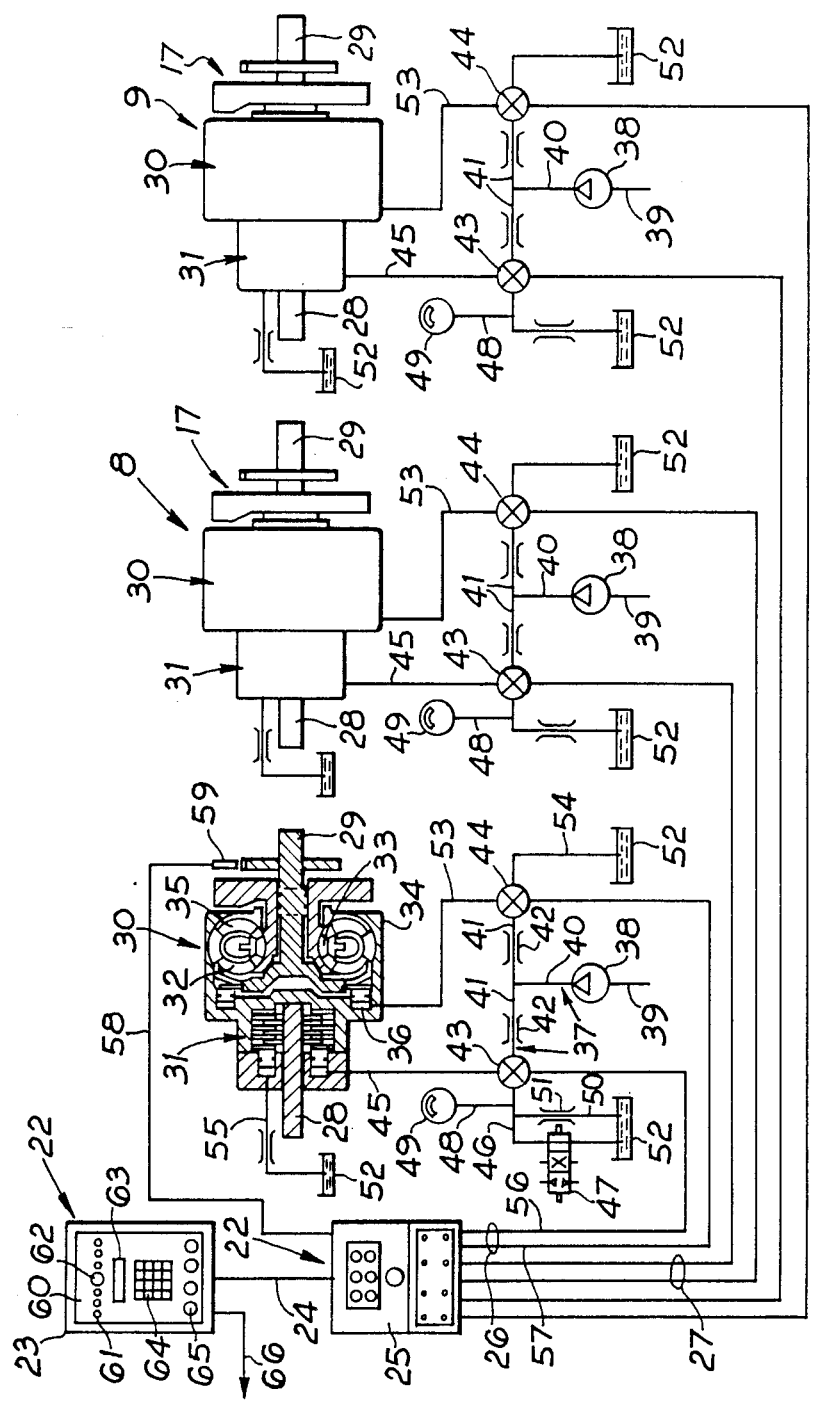
FIG. 3 details the master drive unit and two slave units of the drive system of FIGS. 1 and 2.

In the drawings, is illustrated a belt conveyor 1 having one end defined by one return roller 2 and another end defined by another return roller 3, with a belt 4 having an upper conveying belt run 5 and a lower return belt run 6. Adjacent the return roller 2, drive is applied to return run 6 of the belt 4 by four drive units being a master drive unit 7 and three slave units 8, 9 and 10. Also illustrated in FIG. 1 is the possible use of a so-called booster conveyor 11 intermediate the ends of the conveyor 1, having one end defined by one return roller 12 and another end defined by another return roller 13, and containing two further slave units 14 and 15 to supplement the driving torque of the master unit 7 and sleeve units 8-10.

Illustrated in FIG. 2 is an enlarged drive unit 7, 8, 9, 10, 14 or 15, which can be seen to comprise an electric motor 16, to input torque to a universal control drive 17 (detailed in FIG. 3) to input torque to a speed reduction gearbox 18 an output of which drivably engages a drive drum 19 around a portion of which is lapped the return run 6. Two conventional belt tensioning devices are indicated at 20.

A control system 22 in accordance with the first aspect of the invention comprises a monitor and control unit 23 electrically connected via lead 24 to a multiplexer 25, which has a master outlet 26 connected to the master unit 7, and in particular to the universal control drive 17 thereof, as will be explained in detail with reference to FIG. 3, and five slave outlets 27 connected to the five slave units 8-10 and 14 and 15, the master and slave outlets 26, 27 forming part of an electro-hydraulic control loop. The monitor and control unit 23 contains electronic storage means whereby the so-called "soft" or "ramp" start that would be required for the conveyor 1 can not only be programmed into the unit 23 but readily changed for changed operating circumstances. For instance, the unit 23 may be programmed for the master unit to attain full speed within 0–60 seconds, with the slave units similarly controlled over the selected "ramp" time. As another part of the monitor and control unit 23 can also be programmed for maximum torque, the drive speed will be at a lower than full speed if the torque limit is reached before the full speed is reached.

As indicated in FIG. 3, each drive unit 7–10 and 14 and 15 comprises an input shaft 28 from its associated electric motor 16 and an output shaft 29 to its associated gearbox 18, while the interposed universal control drive 17 comprises a torque converter 30 preceded by a modulated wet clutch 31. The torque converter 30 comprises a turbine 32 connected to the output shaft 29, a stator 33 carried by a casing 34 of the universal control drive 17, and an impeller 35 drivable by the modulated wet clutch 31. The turbine 32 also has a selectively, and hydraulically operable lock-up clutch 36.

An hydraulic circuit 37, also forming part of the electro-hydraulic control loop, serves to control operation of each drive unit 7–10, 14 and 15 is also illustrated in FIG. 3. The circuit 37 comprises a pump 38 connected to a fluid supply source via line 39 and delivery pressure fluid via a line 40 which split into two lines 41 each having a flow restrictor 42 preceding respectively a solenoid operated modulating valve 43 for controlling engagement of the modulated wet clutch 31 and a solenoid operated valve 44 for controlling engagement of the lock-up clutch 36. The lubrication flow path for the wet clutch 31 is not illustrated.

The valve 43 has a first delivery line 45 to the modulated wet clutch 31 and a second delivery line 46 to a manually operable valve 47 for using the drive system in accordance with the first aspect of the invention in a low power mode. This mode is for tensioning the belt 5, by clamping the belt and then driving the master drive unit 7 up to a preset stall, after which the belt 5 can be further clamped for whatever remedial action is required on the clamped and tensioned belt. Connected to the secondary delivery line 46 is a line 48 to a pressure gauge 49 and an exhaust line 50 with a flow restriction 51 leading to a return tank 52.

The valve 44 has a delivery line 53 to the lock-up clutch 36 and an exhaust line 54 to tank 52. An exhaust line 55 for clutch engagement control fluid extends from the wet clutch 31 to tank 52.

As illustrated in FIG. 3, the master outlet 36, and the various slave outlets 27 each comprise electrical outlet leads 56 and 57 respectively for operation of the solenoid valves 43 and 44, which leads 56, 57 also form part of the control loop. Also forming part of the control loop is a lead 58 extending from a speed sensor 59 associated with the output shaft 29 to the multiplexer 25. The latter, as illustrated in FIG. 3 has on a faceplate 60 an array 61 of L.E.D. alarm displays an audible warning sounder 62, a system data display 63, a control program keypad 64, and four operation mode control buttons 65 for, respectively, full/mid speed; high/low power mode, auto/manual; and re-set. A lead 66 extends from the monitor and control unit 23 to a remote set point, such as the belt weigher, a mine operating system assimillation unit etc.

In use, the conveyor 1 is started from rest as follows. With all electric drive motors 16 running, the conveyor 1 is initially in a non-driven mode because the modulated wet clutches 31 of the drive units 8–10, 14 and 15 are not activated, so that although the input shaft 28 of each drive unit is rotating, no drive is transmitted to the respective output shafts 29. Drive is commenced by an electrical signal being transmitted along outlet lead 55 of the multiplexer 25 to the solenoid valve 43 of the master drive unit 7. This displaces a spool of the valve 43 to cause flow of pressure fluid in the first delivery line 45 and hence commence driving engagement of the wet clutch 31, to an extent controlled by the degree of opening of the valve 43 and hence the quantity of fluid supplied to the engagement control circuit of wet clutch 31. Upon partial engagement of the wet clutch 31 torque is transmitted to the output shaft 29 via the torque converter 30, and hence the drive drum 19 commences rotation. Although it is possible for a "drive" signal to be transmitted simultaneously along all output leads from the multiplexer 25, it is usually desirable with a belt conveyor, at start-up, to delay activation of some of the slave units for a short period e.g. to allow a desired belt tension to be generated, to avoid belt throw etc. Thus, the secondary outlet 56 from the multiplexer 25 to the first slave unit 8 may be programmed for a two second delay say, before the "drive" signal is transmitted to the solenoid valve 43 of the first slave unit 8, while a three second delay may be required at the second slave unit 9 etc. These time delays may readily be stored in the multiplexer 25, by standard electronic techniques. Furthermore, the time delays may be readily altered or eliminated by standard electronic techniques e.g. operation of the keypad 64 of the monitor and control unit 23. Elimination, or re-adjustment may be desirable once the conveyor 1 has attained its desired running speed e.g. for simultaneous activation of the master drive unit and all the slave drive units.

What I claim is:

1. A variable speed conveyor drive system, comprising:

a master rotary member of said conveyor;

a variable speed master drive unit to drive said master rotary member;

at least one slave rotary member of said conveyor;

a variable speed slave drive unit to drive each of said slave rotary members;

each of said master and slave drive units comprising an electric motor, a universal control drive incorporating a torque converter and a modulated wet clutch preceding said torque converter, an engagement-control hydraulic circuit for said modulated wet clutch, and a lubrication circuit for said modulated wet clutch;

a monitor and variable speed and variable power control unit for said drive system, a control loop from said master drive unit to said monitor and control unit; and a multiplexer, with a master outlet from said multiplexer for said master drive unit, and with a slave outlet from said multiplexer for said slave drive unit(s), said master multiplexer outlet being connected to said master drive unit to form a part of said control loop whereby all said motors share said load at a pre-programmed level at any speed of operation, and an individually adjustable and programmable time delay means, incorporated in said slave multiplexer outlet which time delay means is operable both before start-up of said conveyor and during running of said conveyor.

2. A drive system as claimed in claim 1, wherein an individually adjustable load share facility is incorporated in said slave outlet(s).

3. A drive system as claimed in claim 1, wherein said multiplexer is provided with five slave outlets.

4. A drive system as claimed in claim 1, wherein said torque converter has a lock-up clutch.

5. A drive system as claimed in claim 1, wherein said control loop is of an electro-hydraulic kind.

6. A drive system as claimed in claim 2, 3, 4 or 5, wherein said conveyor comprises a belt conveyor.

7. A drive system as claimed in claim 1, wherein said conveyor comprises a scraper chain conveyor.

8. A drive system as claimed in claim 7, having a head end and a tail end, with one slave drive unit at said tail end and said master drive unit at said head end.

* * * * *